(12) United States Patent
Li et al.

(10) Patent No.: US 11,766,682 B2
(45) Date of Patent: Sep. 26, 2023

(54) FLOW DIVIDER

(71) Applicant: HCM CO., LTD., Taoyuan (TW)

(72) Inventors: Chen-Chen Li, Taoyuan (TW); Chien-Hsun Lee, Taoyuan (TW)

(73) Assignee: HCM CO., LTD., Taoyuan (TW)

( * ) Notice: Subject to any disclaimer, the term of this patent is extended or adjusted under 35 U.S.C. 154(b) by 86 days.

(21) Appl. No.: 17/590,649

(22) Filed: Feb. 1, 2022

(65) Prior Publication Data

US 2022/0395844 A1 Dec. 15, 2022

(30) Foreign Application Priority Data

Jun. 9, 2021 (TW) .................................. 110120966

(51) Int. Cl.
*B05B 1/34* (2006.01)
*B05B 7/04* (2006.01)

(52) U.S. Cl.
CPC .............. *B05B 1/34* (2013.01); *B05B 7/0483* (2013.01)

(58) Field of Classification Search
CPC ................................ B05B 7/0483; B05B 1/34
USPC ....................................................... 239/433
See application file for complete search history.

(56) References Cited

U.S. PATENT DOCUMENTS 2,259,011 A * 10/1941 Taylor ...................... B05B 7/12
239/419
3,912,164 A * 10/1975 Lefebvre ................... F23R 3/14
239/406
4,314,670 A * 2/1982 Walsh, Jr. ............... B05B 7/065
239/452

OTHER PUBLICATIONS

European Search Report, EP22156564, dated Aug. 10, 2022, European Patent Office. (Year: 2022).*

* cited by examiner

*Primary Examiner* — Chee-Chong Lee
(74) *Attorney, Agent, or Firm* — Hamre, Schumann, Mueller & Larson, P.C.

(57) ABSTRACT

A flow divider for diverging a fluid includes a main body that includes first and second side surfaces being opposite to each other along a central axis of the main body. The first side surface has a central segment transversely intersecting the central axis, and having an inlet channel recessed toward the second side surface, a generally annular channel surrounding the central segment, recessed toward the second side surface, and spatially communicated with the inlet channel at a junction space, and an inclined segment surrounding the annular channel. A width of the annular channel decreases gradually from a start measurement to an end measurement along a rotational direction with respect to the central axis.

2 Claims, 15 Drawing Sheets

FLOW DIVIDER

CROSS-REFERENCE TO RELATED APPLICATION

This application claims priority of Taiwanese Patent Application No. 110120966, filed on Jun. 9, 2021.

FIELD

The disclosure relates to a flow divider, and more particularly to a flow divider adapted to be mounted in an atomization device.

BACKGROUND

In general, a conventional atomization device includes a gas pipeline for inputting a gas, a liquid pipeline for inputting a liquid, and a confluence module provided with a flow divider. The flow divider of the confluence module is configured to receive the liquid from the liquid pipeline and the gas from the gas pipeline, and to discharge the same out of the conventional atomization device. During operation, performance of the conventional atomization device is significantly affected by the uniformity of flow distribution. In order to ensure a uniform flow, a flow channel of the conventional flow divider is designed with an input end and a plurality of output ends each having a cross-sectional area smaller than that of the input end.

Referring to FIGS. 1 to 6, a conventional flow divider 1 includes an inlet channel 11 for receiving a fluid 10, a plurality of spaced-apart diverging passages 12 that are annularly arranged and that are in fluid communication with the inlet channel 11 for diverging the fluid 10, and an outlet slit (not shown) that is annular and that is in fluid communication with the diverging passages 12 for collecting the fluid 10.

Specifically, for the flow divider 1 shown in FIGS. 1 and 2, the diverging passages 12 disposed at an upper layer are misaligned respectively from the diverging passages 12 disposed at an adjacent lower layer by ¼ of the angular distance between two adjacent diverging passages 12; for the flow divider 1 shown in FIGS. 3 and 4, the diverging passages 12 disposed at the upper layer are misaligned respectively from the diverging passages 12 disposed at the adjacent lower layer by ½ of the angular distance between two adjacent diverging passages 12; and for the flow divider 1 shown in FIGS. 5 and 6, the diverging passages 12 disposed at the upper layer are aligned respectively with the diverging passages 12 disposed at the adjacent lower layer. However, such channel design (i.e., having one inlet and multiple outlets) often leads to intensified interferences between the outlets (i.e., the diverging passages 12), and as a result, the overall flow distribution is hard to remain uniform even if the flow rate of each of the diverging passages 12 is stable.

Referring to FIG. 8 and Table 1 below, a computational fluid dynamics (hereinafter referred to as CFD) simulation of an operation of the conventional flow divider 1 is performed by the applicant, and the flow rate at the outlet slit 13 is sampled such that each 18° arch region has 20 angularly equidistant sampling points (see FIG. 7). The fluid 10 is set as a liquid, and the initial flow rate entering the conventional flow divider 1 is set as 40 L/hr.

According to the results shown in FIG. 8 and Table 1, whether the diverging passages 12 are aligned with each other between two adjacent layers or are misaligned by ¼ or ½ of the angular distance between the two layers, the flow rate at each of these sampling points fluctuates between 0.18 M/s to 0.155 M/s and the coefficient of variation is as high as 5.24% to 6.18%, confirming the interferences between diverging passages 12.

| Sampling Angle (°) | Sample No. | Flow Rate (M/s) | | |
|---|---|---|---|---|
| | | misaligned by 1/4 | misaligned by 1/2 | aligned |
| 0 | 1 | 0.173048 | 0.175099 | 0.180187 |
| 18 | 2 | 0.158299 | 0.159317 | 0.164005 |
| 36 | 3 | 0.176202 | 0.177162 | 0.17797 |
| 54 | 4 | 0.159324 | 0.15831 | 0.160084 |
| 72 | 5 | 0.177367 | 0.172974 | 0.177627 |
| 90 | 6 | 0.157755 | 0.160313 | 0.152365 |
| 108 | 7 | 0.172709 | 0.173916 | 0.170088 |
| 126 | 8 | 0.158708 | 0.156442 | 0.152892 |
| 144 | 9 | 0.17569 | 0.17126 | 0.174923 |
| 162 | 10 | 0.159745 | 0.157598 | 0.15641 |
| 180 | 11 | 0.177458 | 0.174786 | 0.173201 |
| 198 | 12 | 0.155699 | 0.158832 | 0.155848 |
| 216 | 13 | 0.177509 | 0.176355 | 0.17721 |
| 234 | 14 | 0.158533 | 0.158036 | 0.15329 |
| 252 | 15 | 0.171689 | 0.171619 | 0.172193 |
| 270 | 16 | 0.154347 | 0.158293 | 0.157077 |
| 288 | 17 | 0.177755 | 0.175373 | 0.179013 |
| 306 | 13 | 0.159005 | 0.158641 | 0.16233 |
| 324 | 19 | 0.177762 | 0.174007 | 0.181176 |
| 342 | 20 | 0.159384 | 0.152052 | 0.163007 |
| Average | | 0.1668994 | 0.16601925 | 0.1670448 |
| Standard Deviation | | 0.00927032 | 0.00869148 | 0.010323947 |
| Coefficient of Variation (%) | | 5.55 | 5.24 | 6.18 |

In addition, referring to in FIGS. 1, 3, and 5, the conventional flow divider 1 is formed by a plurality of fixedly interconnected metal frames (defining the inlet channel 11, and the outlet slit 13) and metal tubes (defining the diverging passages 12). As such, in order to create the above-mentioned misalignment and alignment, the assembly process of the conventional flow divider 1 is rather complicated.

SUMMARY

Therefore, the object of the disclosure is to provide a flow divider that can improve the uniformity of flow distribution with a relatively simpler configuration.

According to the disclosure, a flow divider is adapted to be mounted in an atomization device for diverging a fluid, and includes a main body that includes a first side surface and a second side surface being opposite to each other along a central axis of the main body.

The first side surface has a central segment, a generally annular channel and an inclined segment. The central segment transversely intersects the central axis, and has an inlet channel recessed toward the second side surface. The annular channel surrounds the central segment, is recessed toward the second side surface, and is spatially communicated with the inlet channel at a junction space disposed between two first imaginary lines that extend radially with respect to the central axis. The inclined segment surrounds the annular channel.

A width of the annular channel along a radial direction of the central axis has a start measurement along one of the first imaginary lines, and an end measurement along the other one of the first imaginary lines. The end measurement is smaller than the start measurement. The width of the annular channel decreases gradually from the start measurement to the end measurement along a rotational direction with respect to the central axis. The inclined segment has one of a first configuration, in which the inclined segment extends outwardly with respect to the central axis and toward the second side surface, and a second configuration, in which the inclined segment extends outwardly with respect to the central axis and away from the second side surface.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
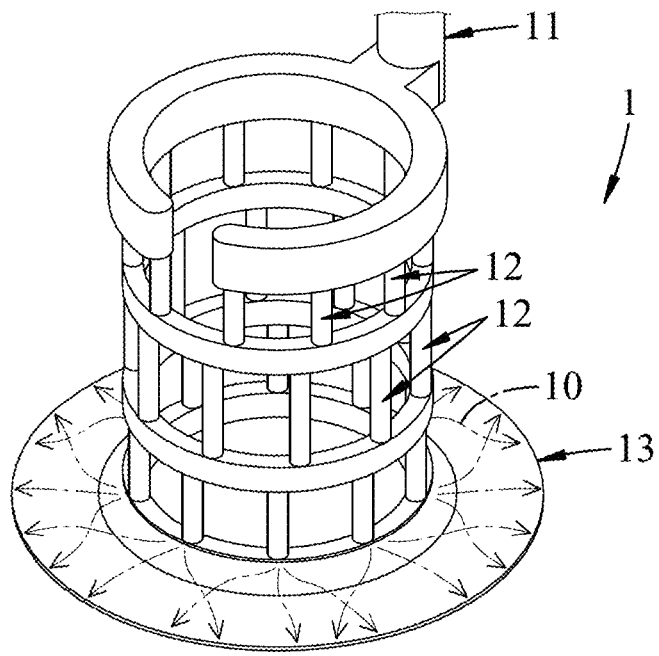
FIG. 1 is a perspective view illustrating a conventional flow divider having a plurality of diverging passages that are misaligned between an upper layer and a lower layer by ¼ of an angular distance between two adjacent diverging passages 12.
Figure 2:
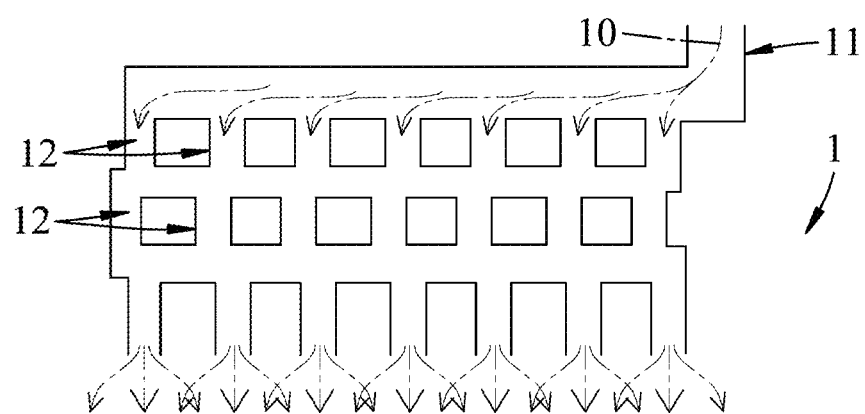
FIG. 2 is a schematic diagram of the conventional flow divider, illustrating flow directions and interferences of a fluid during operation.
Figure 3:
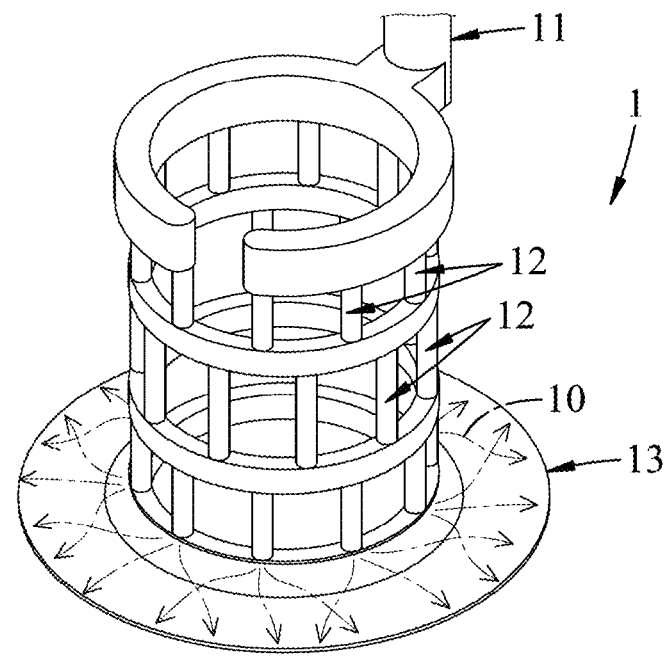
FIG. 3 is a perspective view illustrating a variation of the conventional flow divider, in which the diverging passages are misaligned by ½ of the angular distance.
Figure 4:
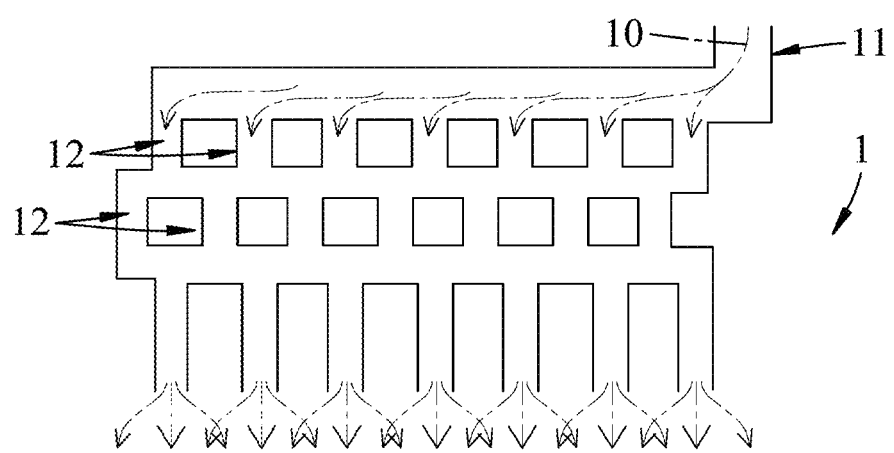
FIG. 4 is a schematic diagram of the variation shown in FIG. 3, illustrating flow directions and interferences of the fluid during operation.
Figure 5:
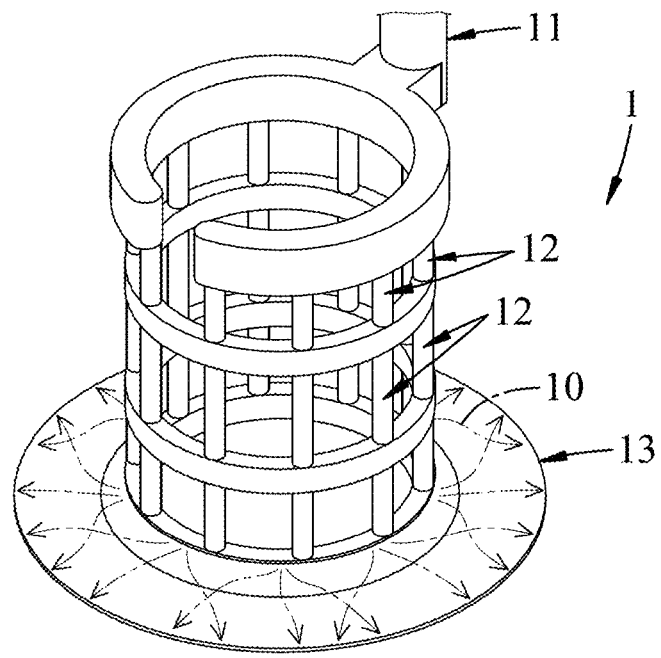
FIG. 5 is a perspective view illustrating another variation of the conventional flow divider, in which the diverging passages are aligned with each other between the upper and lower layers.
Figure 6:
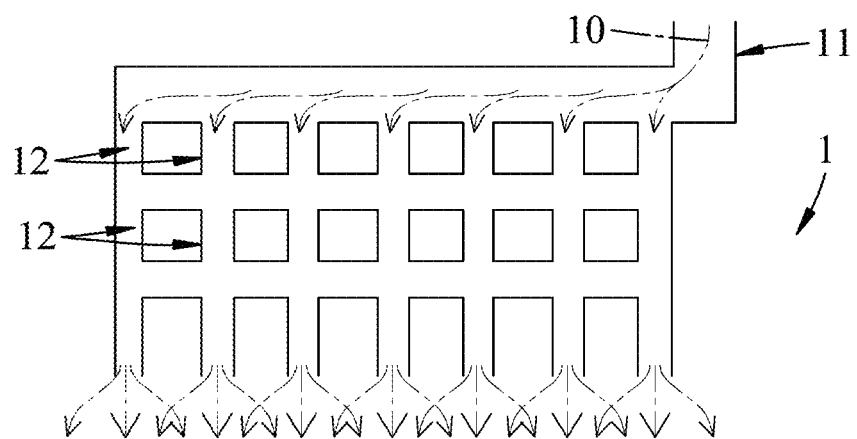
FIG. 6 is a schematic diagram of the variation shown in FIG. 5, illustrating flow directions and interferences of the fluid during operation.
Figure 7:
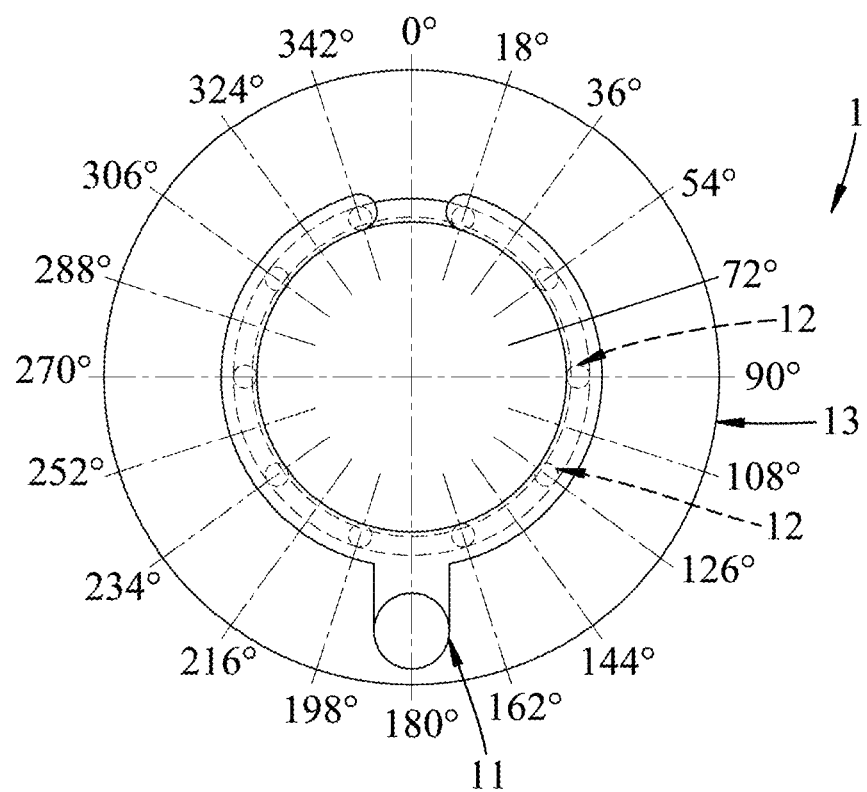
FIG. 7 is a schematic top view of the conventional flow divider, illustrating a plurality of flow rate sampling points under a computational fluid dynamic (CFD) simulation.
Figure 8:
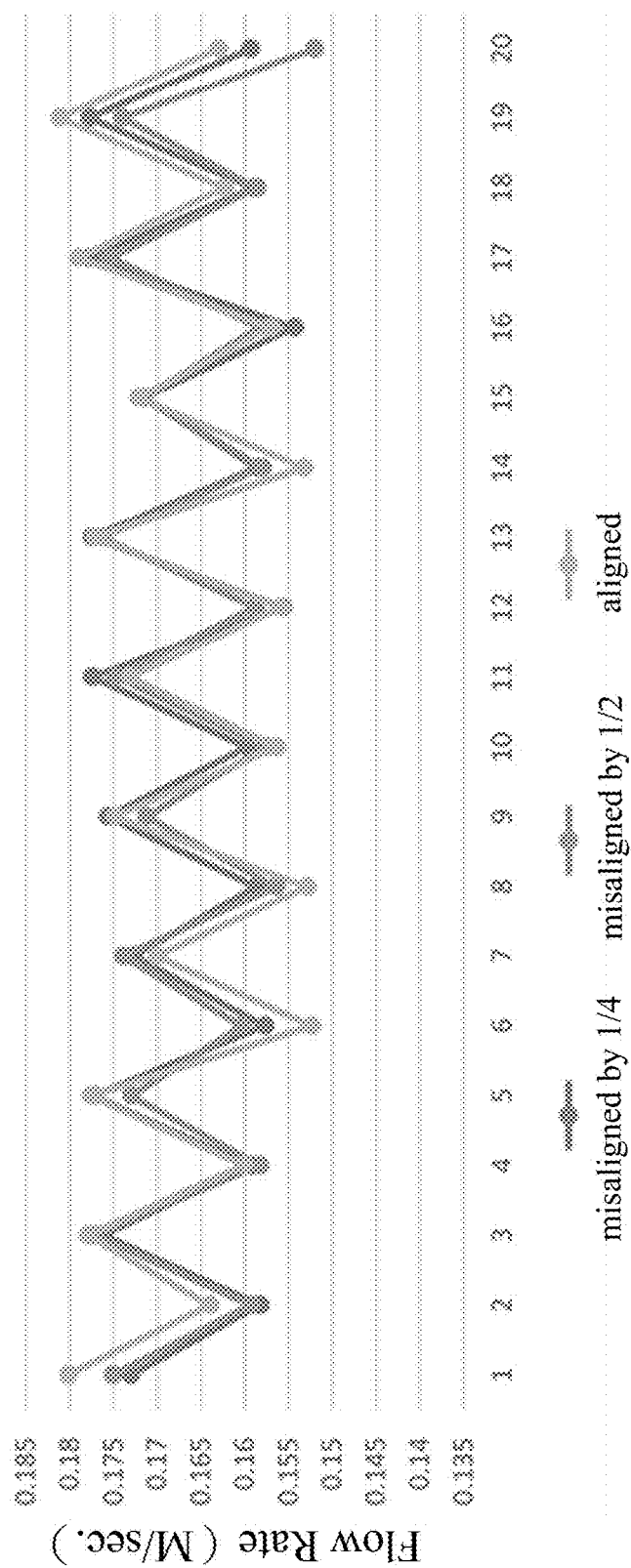
FIG. 8 is a flow rate diagram, illustrating the flow rate results obtained at the sampling points shown in FIG. 7.

Before the present disclosure is described in greater detail, it should be noted that where considered appropriate, reference numerals or terminal portions of reference numerals have been repeated among the figures to indicate corresponding or analogous elements, which may optionally have similar characteristics.

Figure 9:
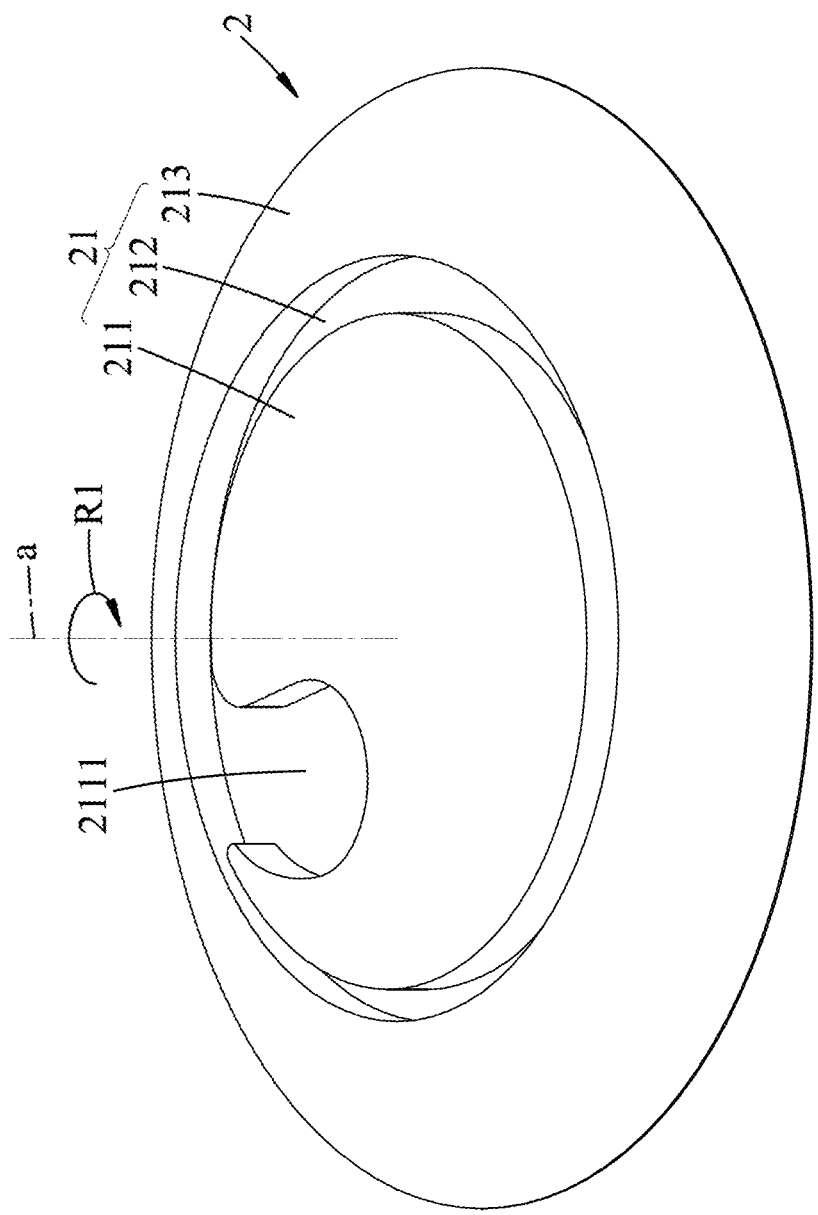
FIG. 9 is a perspective view illustrating a first embodiment of a flow divider according to the disclosure.
Figure 10:
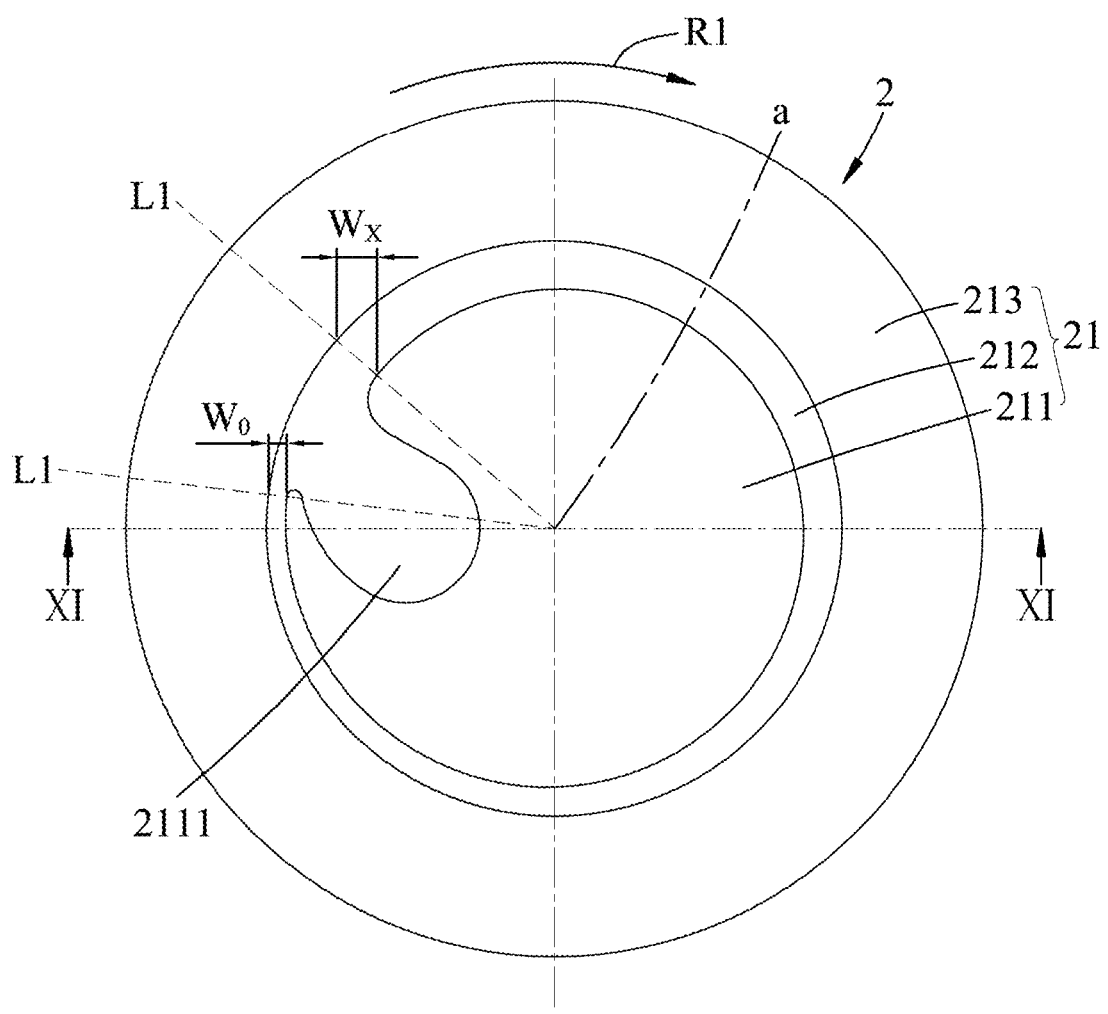
FIG. 10 is a top view of the first embodiment, illustrating an annular channel and an inclined segment disposed at a first side surface of the first embodiment.
Figure 11:
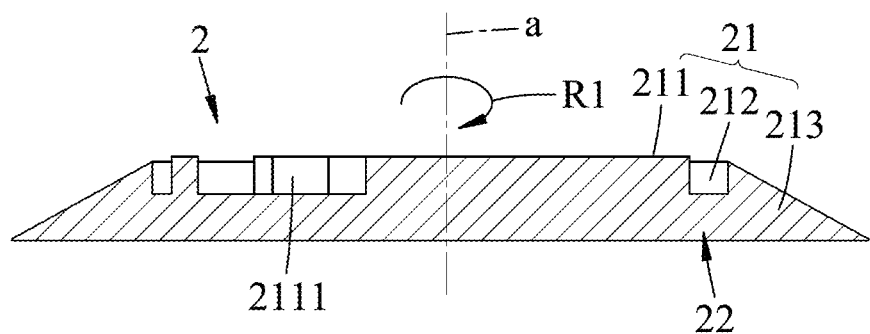
FIG. 11 is a cross-sectional view taken along line XI-XI in FIG. 10, illustrating configuration of the inclined segment of the first embodiment.

Referring to FIGS. 9, 10 and 11, a first embodiment of a flow divider according to the disclosure is adapted to be mounted in an atomization device (not shown) for diverging a fluid (not shown), which is to be discharged through an outlet slit (not shown) of the atomization device. The flow divider includes a main body 2 that has a first side surface 21 and a second side surface 22 which are opposite to each other along a central axis (a) of the main body 2. In the present embodiment, the main body is made of stainless steel, and has a round plate shape.

The first side surface 21 has a central segment 211, a generally annular channel 212 and an inclined segment 213. The central segment 211 transversely intersects the central axis (a), and has an inlet channel 2111 recessed toward the second side surface 22. The annular channel 212 surrounds the central segment 211, is recessed toward the second side surface 22, and is spatially communicated with the inlet channel 2111 at a junction space disposed between two first imaginary lines (L1) that extend radially with respect to the central axis (a). The inclined segment 213 surrounds the annular channel 212.

As shown in FIG. 10, a width of the annular channel 212 along a radial direction of the central axis (a) has a start measurement (Wx) along one of the first imaginary lines (L1), and an end measurement (Wo) along the other one of the first imaginary lines (L1). The end measurement (Wo) is smaller than the start measurement (Wx). The width of the annular channel 212 decreases gradually from the start measurement (Wx) to the end measurement (Wo) along a first rotational direction (R1) with respect to the central axis (a). The inclined segment 213 has one of a first configuration, in which the inclined segment 213 extends outwardly with respect to the central axis (a) and toward the second side surface 22, and a second configuration, in which the inclined segment 213 extends outwardly with respect to the central axis (a) and away from the second side surface 22.

Specifically, in this embodiment, the first configuration of the inclined segment 213 is adopted such that the inclined segment 213 extends outwardly with respect to the central axis (a) and toward the second side surface 22 (i.e., extending downwardly). On the other hand, when the fluid to be diverged is a liquid, which is heavier than air, the second configuration of the inclined segment 213 is adopted such that the inclined segment 213 extends outwardly with respect to the central axis (a) and away from the second side surface 22 (i.e., extending upwardly).

Figure 12:
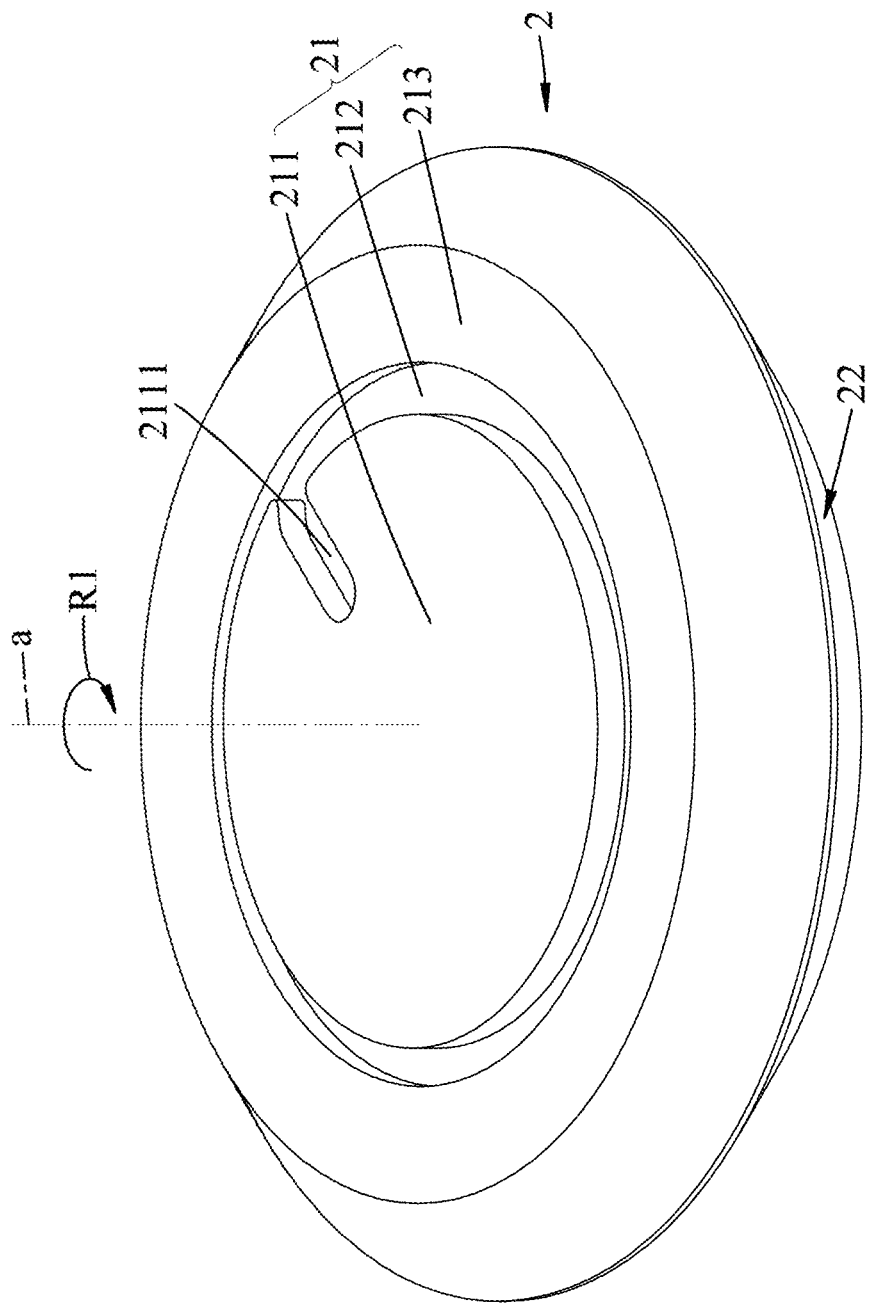
FIG. 12 is a perspective view illustrating a second embodiment of the flow divider according to the disclosure.
Figure 13:
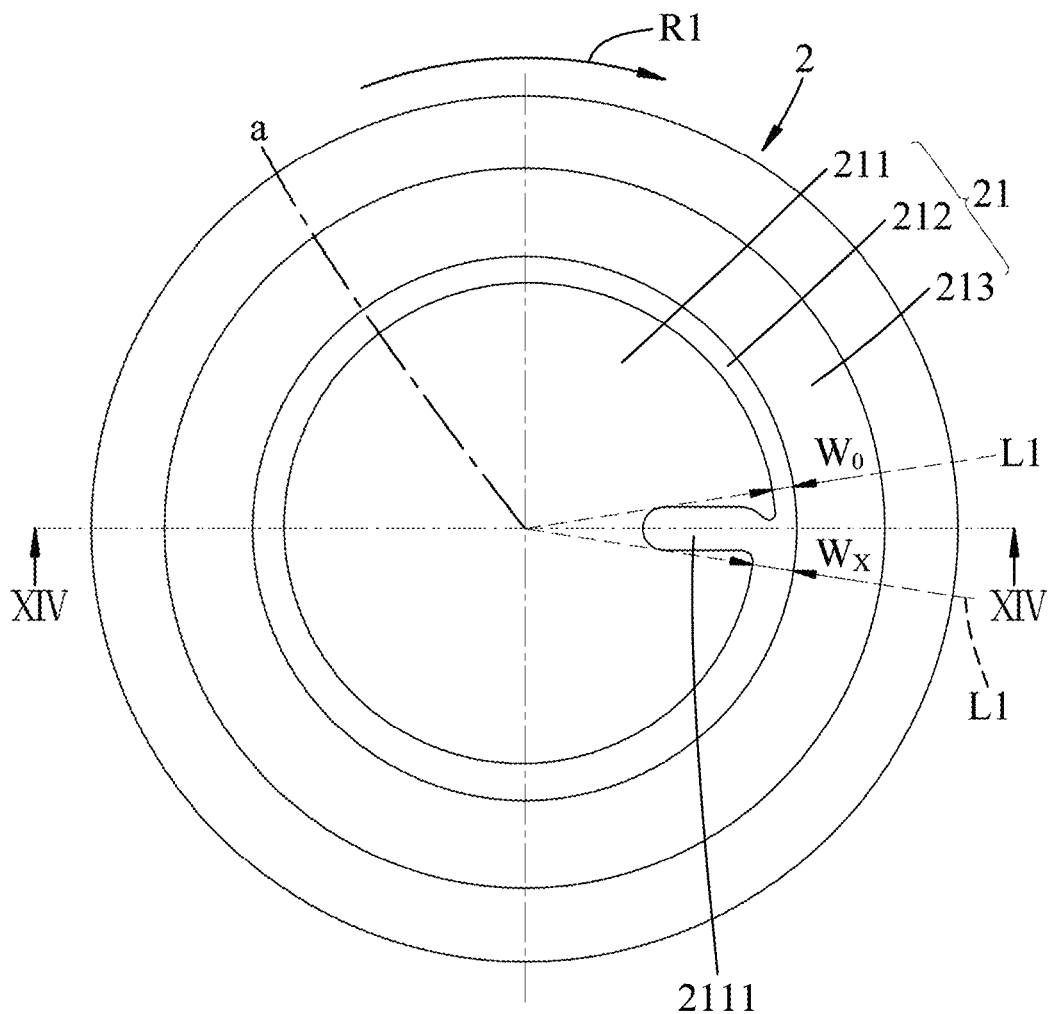
FIG. 13 is a top view of the second embodiment, illustrating the annular channel and the inclined segment disposed at the first side surface of the second embodiment.
Figure 14:
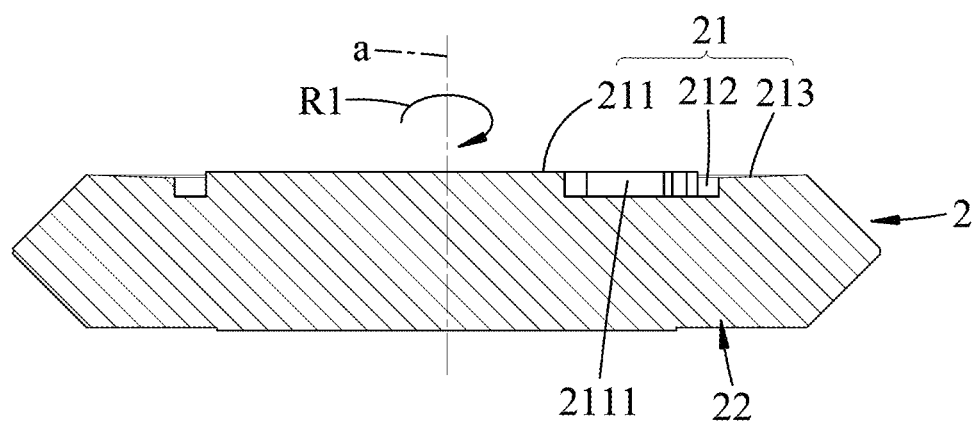
FIG. 14 is a cross-sectional view taken along line XIV-XIV in FIG. 13, illustrating configuration of the inclined segment of the second embodiment.

Referring to FIGS. 12, 13 and 14, a second embodiment of the flow divider according to the disclosure is similar to the first embodiment, and the difference between the two resides in that, in the second embodiment, the first side surface 21 of the flow divider is configured to diverge a liquid.

As mentioned above, when the fluid to be diverged is a liquid, the second configuration of the inclined segment 213 is adopted, as shown in FIG. 14, and the inclined segment 213 extends outwardly with respect to the central axis (a) and away from the second side surface 22.

Similar to the previous embodiment, as shown in FIG. 10, the annular channel 212 is spatially communicated with the inlet channel 2111 at a junction space disposed between two first imaginary lines (L1) that extend radially with respect to the central axis (a), and the width of the annular channel 212 along a radial direction of the central axis (a) has a start measurement (Wx) along one of the first imaginary lines (L1), and an end measurement (Wo) along the other one of the first imaginary lines (L).

It should be noted that, although the second embodiment is used to diverge liquid, the inclined segment 213 is not limited to the second configuration as shown in FIG. 14. When the volumetric flow rate of the liquid is significantly increased, the first configuration of the inclined segment 213 may still be adopted.

Figure 15:
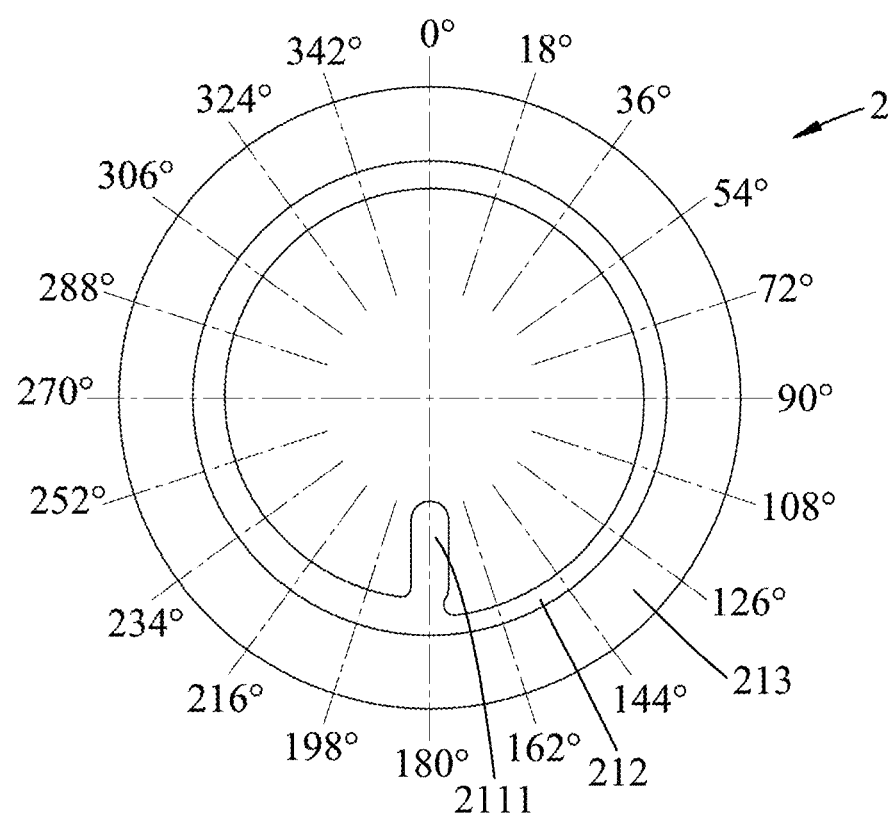
FIG. 15 is a schematic top view of the second embodiment, illustrating a plurality of flow rate sampling points under a computational fluid dynamic (CFD) simulation.
Figure 16:
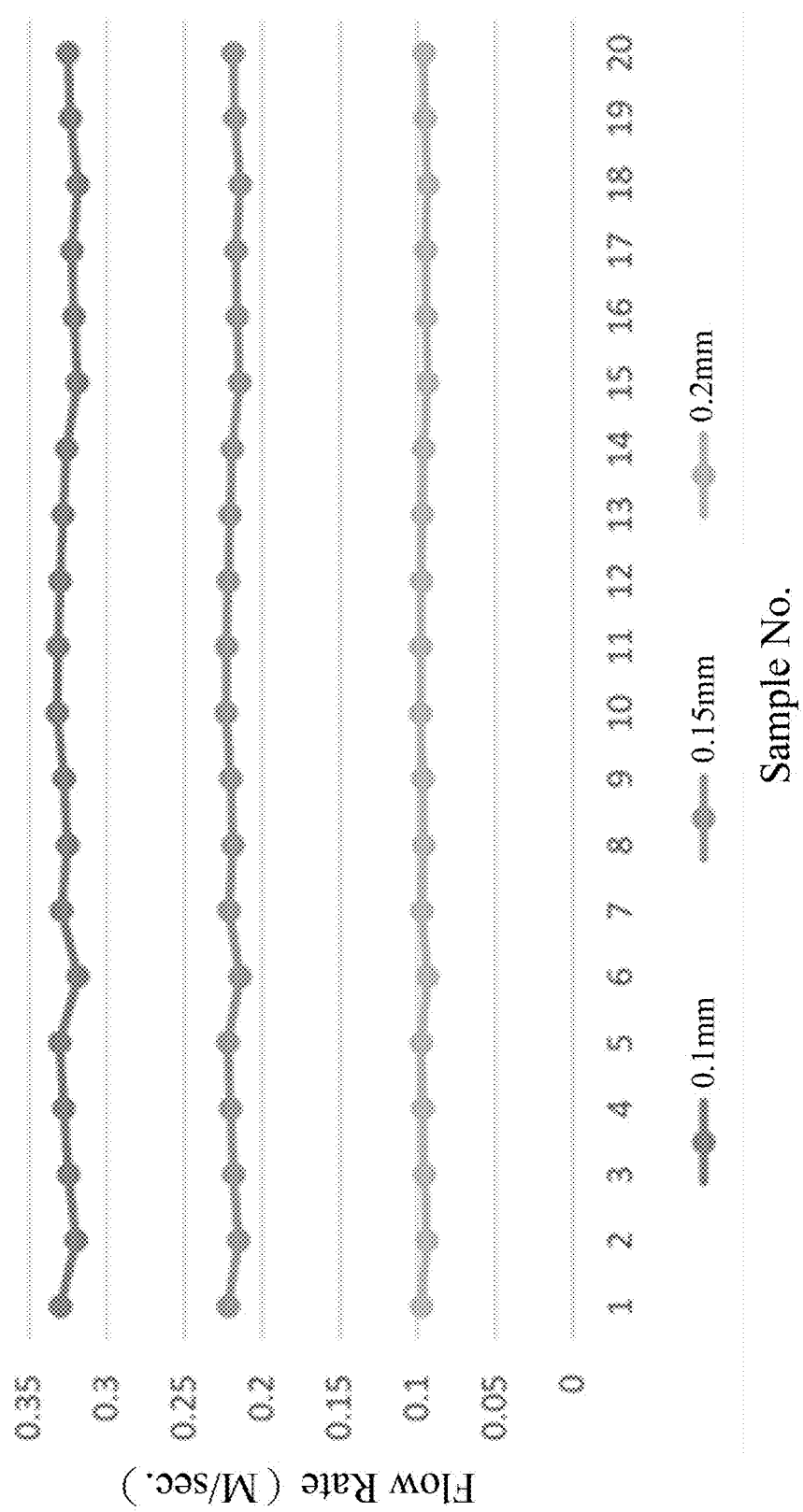
FIG. 16 is a flow rate diagram, illustrating the flow rate results obtained at the sampling points shown in FIG. 15.

Referring to FIGS. 15 and 16, a CFD simulation of the second embodiment of the flow divider is performed by the applicant, and the flow rate is taken such that each 18° arch region has 20 sampling points (see FIG. 15). The fluid type is set as liquid, the flow rate is set as 40 L/hr, and a width of the outlet slit (not shown) of the atomization device is set to have three measurements: 0.1 mm, 0.15 mm and 0.2 mm.

TABLE 2

| Sampling Angle (°) | Sample No. | Flow Rate (M/s) | | |
|---|---|---|---|---|
| | | 0.1 mm | 0.15 mm | 0.2 mm |
| 0 | 1 | 0.32983 | 0.22188 | 0.09744 |
| 18 | 2 | 0.31979 | 0.21519 | 0.09409 |
| 36 | 3 | 0.32456 | 0.21837 | 0.09568 |
| 54 | 4 | 0.32762 | 0.22041 | 0.0967 |
| 72 | 5 | 0.33023 | 0.22215 | 0.09757 |
| 90 | 6 | 0.31854 | 0.21436 | 0.09368 |
| 108 | 7 | 0.32908 | 0.22139 | 0.09719 |
| 126 | 8 | 0.32519 | 0.21879 | 0.09589 |
| 144 | 9 | 0.32743 | 0.22028 | 0.09664 |
| 162 | 10 | 0.33192 | 0.22328 | 0.09814 |
| 180 | 11 | 0.33142 | 0.22294 | 0.09797 |
| 198 | 12 | 0.33001 | 0.222 | 0.09751 |
| 216 | 13 | 0.32819 | 0.22079 | 0.09689 |
| 234 | 14 | 0.32593 | 0.21928 | 0.09614 |
| 252 | 15 | 0.31892 | 0.21461 | 0.09381 |
| 270 | 16 | 0.32117 | 0.21611 | 0.09455 |
| 288 | 17 | 0.3224 | 0.21693 | 0.09497 |
| 306 | 13 | 0.31863 | 0.21424 | 0.09362 |
| 324 | 19 | 0.32338 | 0.21758 | 0.09529 |
| 342 | 20 | 0.32507 | 0.21871 | 0.09585 |
| Average | | 0.3254655 | 0.2189645 | 0.095981 |
| Standard Deviation | | 0.004423112 | 0.002963006 | 0.001481372 |
| Coefficient of Variation (%) | | 1.36 | 1.35 | 1.54 |

Referring to FIG. 16 and Table 2, according to the simulation results shown therein, the flow rate decreases as the width of the outlet slit increases. When the width of outlet slit is 0.1 mm, the flow rate falls approximately between 0.319 M/s and 0.331 M/s, and is fairly stable with small fluctuation, and the coefficient of variation is 1.36%. When the width of outlet slit is 0.15 mm, the flow rate falls approximately between 0.214 M/s and 0.223 M/s, with fluctuation smaller than that of the previous case (0.1 mm), and the coefficient of variation is 1.35%. When the width of outlet slit is 0.2 mm, the flow rate falls approximately between 0.093 M/s and 0.098 M/s, with a similar range of fluctuation, and the coefficient of variation is 1.54%.

In view of the above, it is confirmed that the second embodiment is able to maintain the uniformity of the flow distribution regardless of dimensional change of the outlet slit.

Specifically, the liquid introduced into the annular channel 212 through the inlet channel 2111 of the second embodiment flows in both of the first and second rotational directions (R1, R2) along the annular channel to its full circumference and then expands uniformly across the inclined segment 213. It should be noted that, a decreasing rate of the width of annular channel 212 is determined by setting an initial flow rate of the liquid (i.e., the flow rate of the liquid when entering the annular channel 212) as ½ of an average flow rate of the liquid. More specifically, in the second embodiment, the annular channel 212 is configured in such a manner (i.e., the width decreases gradually) to result in the gradually increasing flow rate, and the end measurement (Wo) of the width is designed as such to buffer the expanding of the liquid across the inclined segment 213. Moreover, the configuration of the inclined segment 213 facilitates the liquid to expand upwardly and outwardly along radial directions of the central axis (a) from the annular channel 212 in a uniform and continuous manner.

Figure 17:
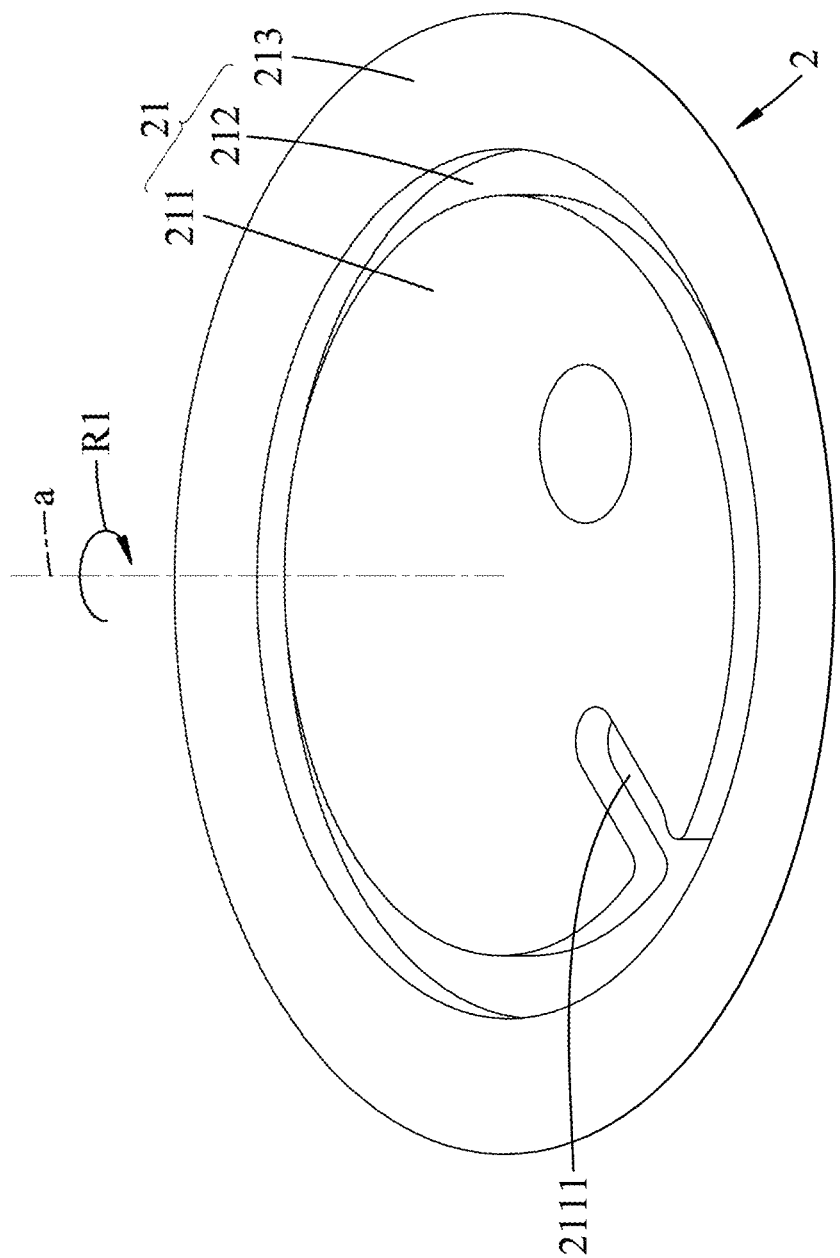
FIG. 17 is a perspective view illustrating a third embodiment of the flow divider according to the disclosure.
Figure 18:
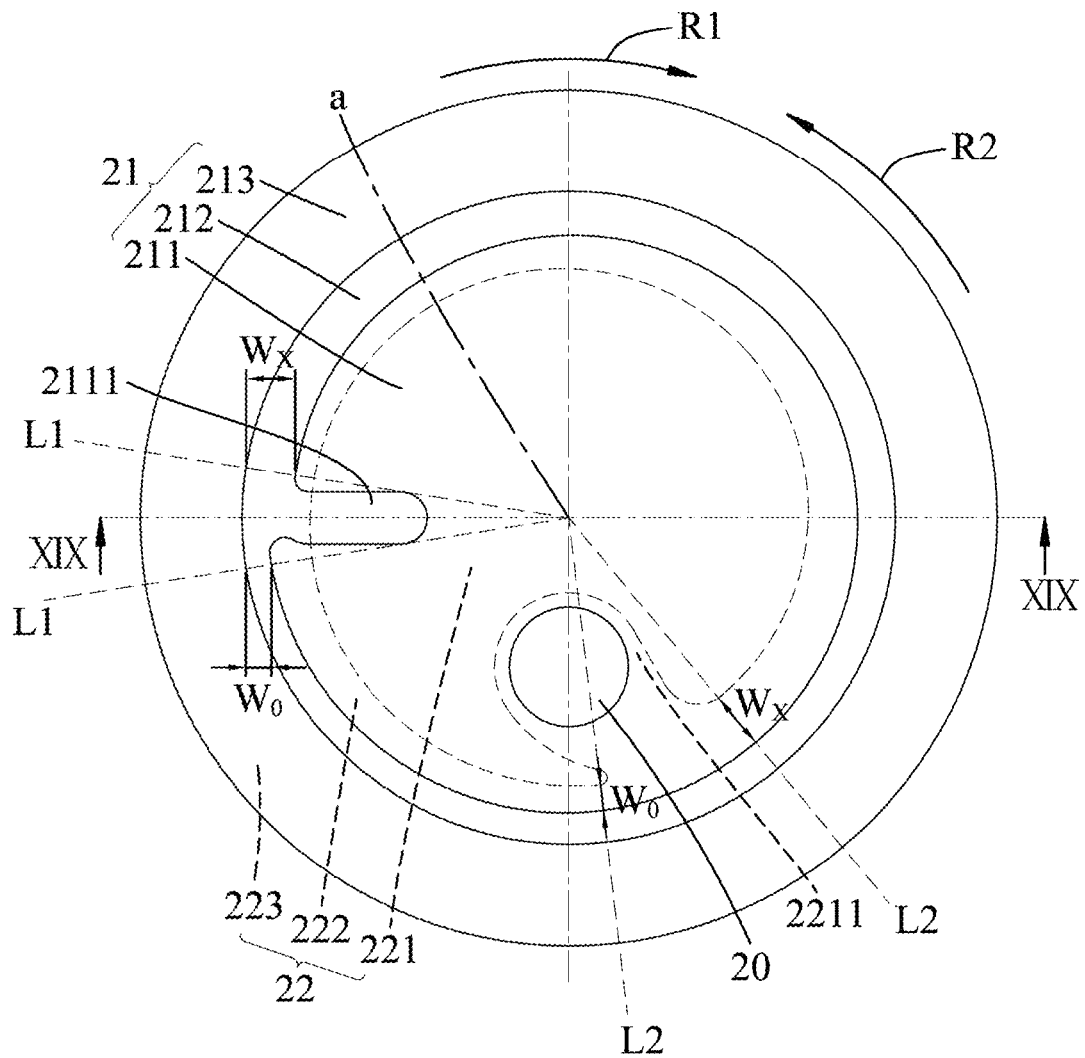
FIG. 18 is a top view of the third embodiment, illustrating the annular channel and the inclined segment disposed at the first side surface of the first embodiment.
Figure 19:
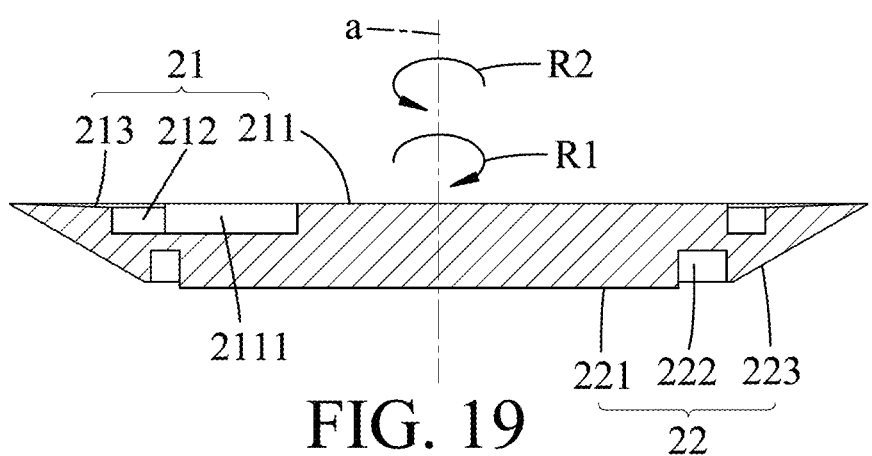
FIG. 19 is a cross-sectional view taken along line XIX-XIX in FIG. 18, illustrating configuration of the inclined segment of each of the first and second side surfaces of the third embodiment.

Referring to FIGS. 17, 18 and 19, a third embodiment of the flow divider according to the disclosure is similar to the second embodiment, and the difference between the two resides in that, in the third embodiment, the flow divider is configured to diverge both a gas and a liquid.

Specifically, in the present embodiment, the main body 2 further includes at least one inlet hole 20 that is formed in the central segment 211 of the first side surface 21, and that extends through the first side surface 21 and the second side surface 22.

The second side surface 22 of the main body 2 has a central segment 221, a generally annular channel 222 and an inclined segment 223. The central segment 221 of the second side surface 22 transversely intersects the central axis (a), and has an inlet channel 2211 recessed toward the first side surface 21 and in spatial communication with the at least one inlet hole 20. The annular channel 222 of the second side surface 22 surrounds the central segment 221 of the second side surface 22, is recessed toward the first side surface 21, and is spatially communicated with the inlet channel 2211 of the second side surface 22 at a junction space disposed between two second imaginary lines (L2) that extend radially with respect to the central axis (a). The inclined segment 223 of the second side surface 22 surrounds the annular channel 222 of the second side surface 22.

A width of the annular channel 222 of the second side surface 22 along a radial direction of the central axis (a) has a start measurement (Wx) along one of the second imaginary lines (L2), and an end measurement (Wo) along the other one of the second imaginary lines (L2). The end measurement (Wo) of the width of the annular channel 222 of the second side surface 22 is smaller than the start measurement (Wx) of the width of the annular channel 222 of the second side surface 22, and the width of the annular channel 222 of the second side surface 22 decreases gradually from the start measurement (Wx) to the end measurement (Wo) along a second rotational direction (R2) which is opposite to the first rotational direction (R1) with respect to the central axis (a).

The inclined segment 223 of the second side surface 22 has one of a first configuration, in which the inclined segment 223 of the second side surface 22 extends outwardly with respect to the central axis (a) and toward the first side surface 21 (i.e., extending upwardly), and a second configuration, in which the inclined segment 223 extends outwardly with respect to the central axis (a) and away from the first side surface 21 (i.e., extending downwardly).

In the present embodiment, the second side surface 22 is configured to diverge a gas and the first configuration is adopted, where the inclined segment 223 extends outwardly and toward the first side surface 21 (see FIG. 19). Specifically, when the present embodiment is used in the atomization device (not shown) to diverge both a liquid and a gas, the liquid is to travel from the inlet channel 2111 through the central segment 221 and the inclined segment 213 of the first side surface 21 in order, and the gas is to enter the inlet hole 20 of the main body 2 through an entrance tube (not shown) of the atomization device, and then through the inlet channel 2211, the annular channel 222 and the inclined segment 223 of the second side surface 22 in order. In such a manner, the liquid and the gas encounter and interact with each other at a circumferential periphery of the inclined segment 213 of the first side surface 21 and a circumferential periphery of the inclined segment 223 of the second side surface 22.

Figure 20:
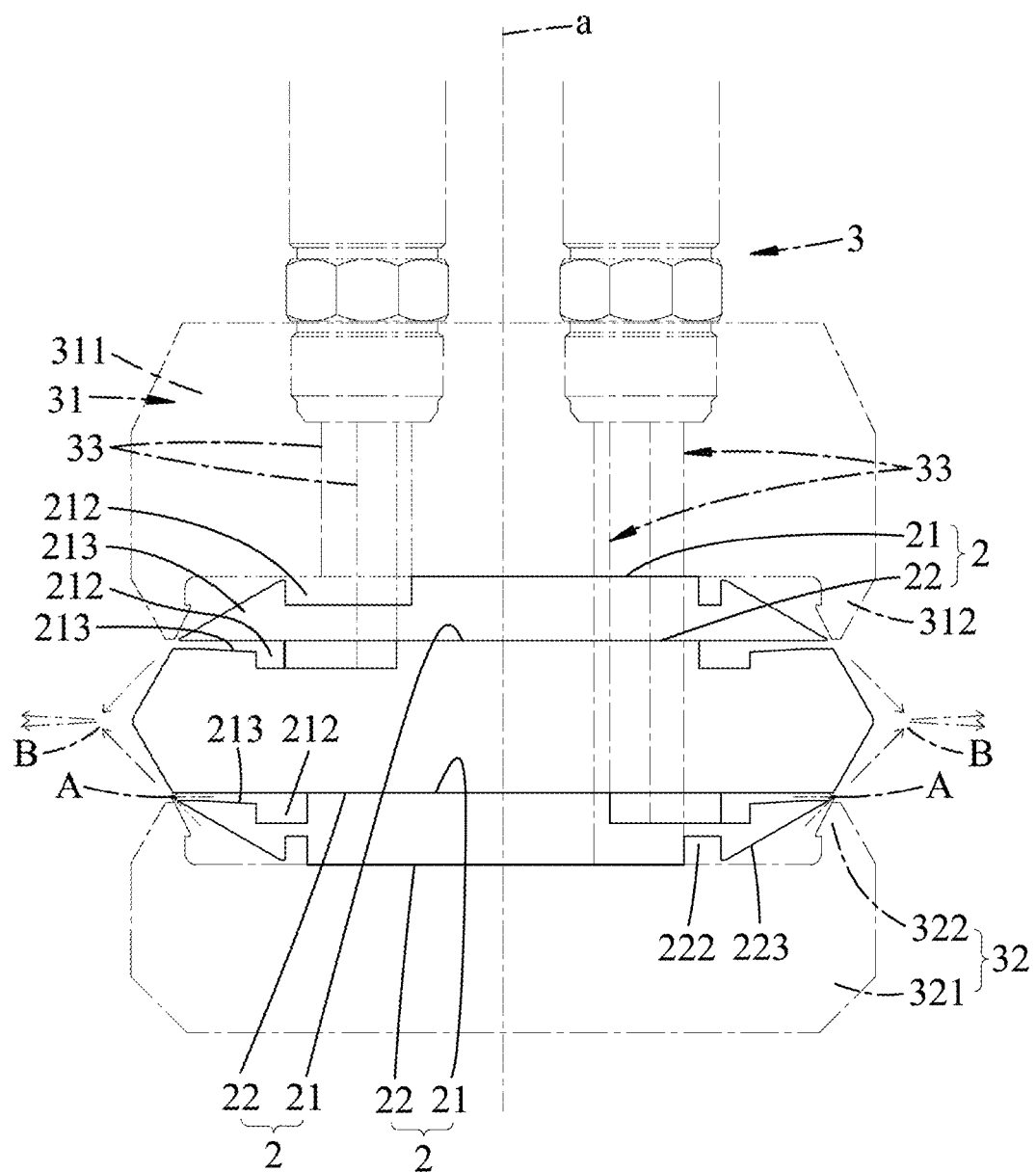
FIG. 20 is a schematic fragmentary side view of an external-mixing four-fluid atomization device mounted with the embodiments of the flow divider, illustrating a state of the same during an operation.
Figure 21:
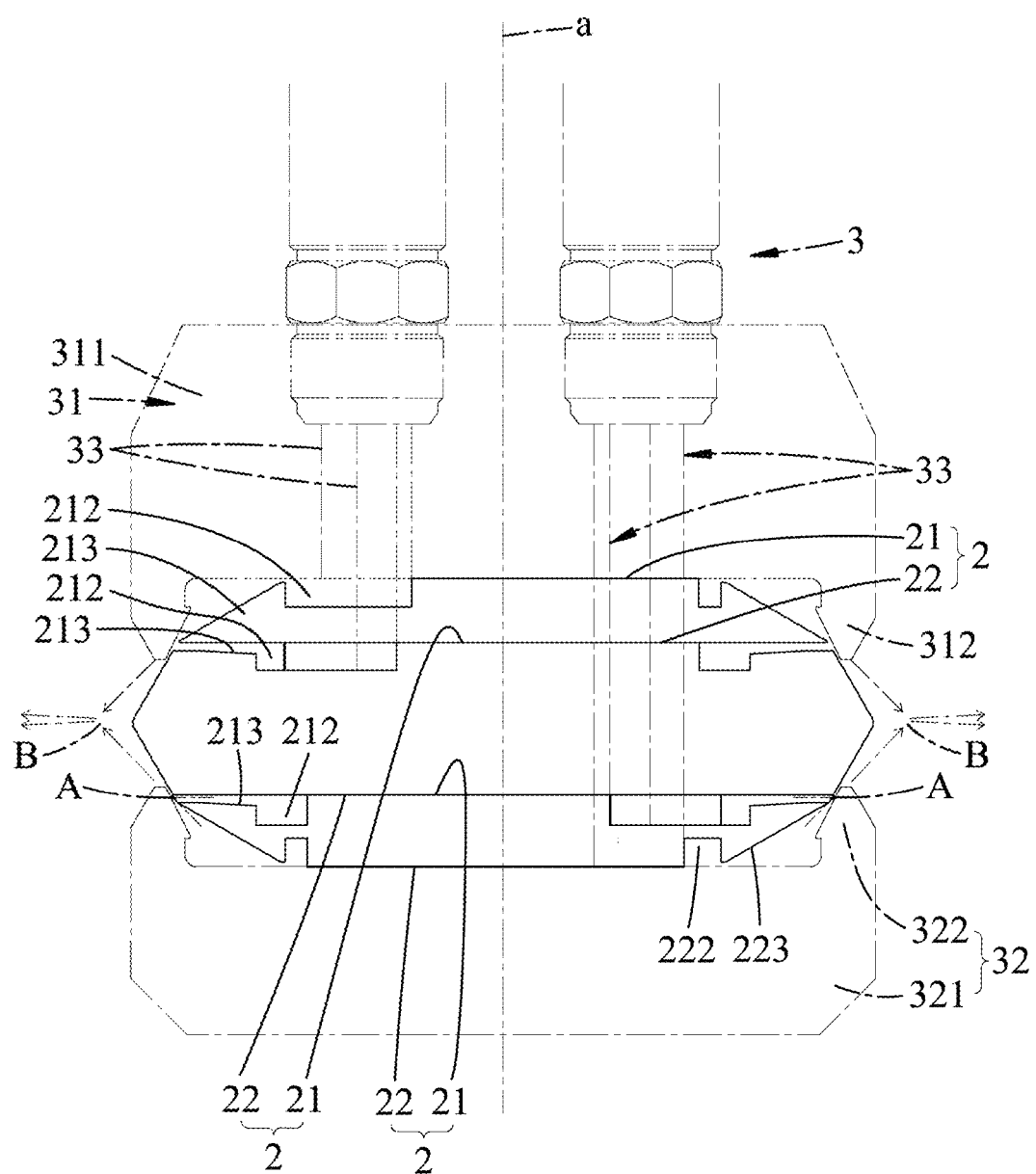
FIG. 21 is a schematic fragmentary side view of an internal-mixing four-fluid atomization device mounted with the embodiments of the flow divider, illustrating a state of the same during an operation.

Referring to FIGS. 20 and 21, for further understanding of the structural details and operation of the above-mentioned embodiments, configuration and operation of an external-mixing four-fluid atomization device 3 that is mounted with all three of the above-mentioned embodiments of the flow divider are described as follows.

The four-fluid atomization device 3 includes an upper seat 31, a lower seat 32 and four entrance tubes 33. The upper seat 31 and the lower seat 32 are spaced apart from each other along the central axis (a). The above-mentioned embodiments of the flow dividers are dispose between the upper seat 31 and the lower seat 32 and arranged, from top to bottom, in the following order: the first embodiment, the second embodiment and the third embodiment. The first side surface 21 of the main body 2 of each of the first, second and third embodiments faces upwardly, and the second side surface 22 of the main body 2 of the same faces downwardly. The entrance tubes 33 extend through the upper seat 31. Two of the entrance tubes 33 are configured for inputting a first gas and a second gas, and the other two of the entrance tubes 33 are configured for inputting a first liquid and a second liquid. Each of the first and second embodiments is formed with a through hole (not shown) that is disposed in the central segment 211 of the main body 2 and that extends through the first and second side surfaces 21, 22 so as to allow the liquid and gas inputted by the corresponding entrance tubes 33 to travel therethrough.

Specifically, when the first and second gases travel through the corresponding two of the entrance tubes 33, and enter the inlet channel 2111 of the first side surface 21 of the main body 2 of the first embodiment and the inlet channel 2211 of the second side surface 22 of the main body 2 of the third embodiment, respectively, the first gas flows outwardly from the inlet channel 2111 of the first side surface 21 of the main body 2 of the first embodiment through the annular channel 212 and the inclined segment 213, and the second gas flows outwardly from the inlet channel 2211 of the second side surface 22 of the main body 2 of the third embodiment through the annular channel 222 and the inclined segment 223.

Also, when the first and second liquids travel through the other two of the entrance tubes 33, and enter the inlet channel 2111 of the first side surface 21 of the main body 2 of the second embodiment and the inlet channel 2111 of the first side surface 21 of the main body 2 of the third embodiment, respectively, the first liquid flows outwardly from the inlet channel 2111 of the first side surface 21 of the main body 2 of the second embodiment through the annular channel 212 and the inclined segment 213, and the second liquid flows outwardly from the inlet channel 2111 of the first side surface 21 of the main body 2 of the third embodiment through the annular channel 212 and the inclined segment 213.

As the first gas flows outwardly and downwardly from the inclined segment 213 of the first side surface 21 of the first embodiment, the first liquid simultaneously flows outwardly and upwardly from the inclined segment 213 of the first side surface 21 of the second embodiment. In such a manner, the first gas and the first liquid encounter each the at a circumferential periphery of the inclined segment 213 of the first side surface 21 of the first embodiment and a circumferential periphery of the inclined segment 213 of the first side surface 21 of the second embodiment. Similarly, as the second gas flows outwardly and upwardly from the inclined segment 223 of the second side surface 22 of the third embodiment, the second liquid simultaneously flows outwardly and upwardly from the inclined segment 213 of the first side surface 21 of the third embodiment. In such a manner, the second gas and the second liquid encounter each the at a circumferential periphery of the inclined segment 223 of the second side surface 22 of the third embodiment and a circumferential periphery of the inclined segment 213 of the first side surface 21 of the third embodiment. The encountering of the second gas and the second liquid is defined as a first encounter (A) as shown in FIG. 20.

As shown in FIG. 20, the upper seat 31 has a top wall 311, and an upper surrounding wall 312 that extends downwardly from a periphery of the top wall 311. The lower seat 32 has a bottom wall 321, and a lower surrounding wall 322 that extends upwardly from a periphery of the bottom wall 321.

A bottom periphery of the upper surrounding wall 312 of the upper seat 31 is disposed slightly above an outermost periphery of the inclined segment 213 of the first side surface 21 of the first embodiment and an outermost periphery of the inclined segment 213 of the first side surface 21 of the second embodiment, such that the bottom periphery of the upper surrounding wall 312 of the upper seat 31 cooperates with the outermost periphery of the inclined segment 213 of the first side surface 21 of each of the first and second embodiments to define an annular upper exit slit. Similarly, a top periphery of the lower surrounding wall 322 of the lower seat 32 is disposed slightly below an outermost periphery of the inclined segment 213 of the first side surface 21 of the third embodiment and an outermost periphery of the inclined segment 223 of the second side surface 22 of the third embodiment, such that the top periphery of the lower surrounding wall 322 of the lower seat 32 cooperates with the outermost periphery of the inclined segment 213 of the first side surface 21 and the outermost periphery of the inclined segment 223 of the second side surface 22 of the third embodiment to define an annular lower exit slit.

As shown in FIG. 20, the first encounter (A) occurs outside the upper seat 31 and the lower seat 32, that is, the encountering and mixing of the second gas and the second liquid occur outside the four-fluid atomization device 3. In the same manner, the encountering and mixing of the first gas and the first liquid also occur outside the four-fluid atomization device 3. After the first encounter (A), the first gas and the first liquid are mixed to form a first liquid-gas mixed fluid, and the second gas and the second liquid are mixed to form a second liquid-gas mixed fluid. The first and second liquid-gas mixed fluids then further encounter each other, which is defined as a second encounter (B) (see FIG. 20). Finally, the second encounter (B) turns the liquid-gas mixed fluids into granules that are dispersed radially away from the four-fluid atomization device 3. In view of the above, it should be noted that the term "external-mixing" mentioned above refers to the first encounter (A) of the fluids occurring outside the four-fluid atomization device 3.

Referring to FIG. 21, an internal-mixing four-fluid atomization device 3 that is mounted with the embodiments of the flow dividers in a state of operation is illustrated. In this internal-mixing type of the four-fluid atomization device 3, the bottom periphery of the upper surrounding wall 312 of the upper seat 31 is disposed slightly below the outermost periphery of the inclined segment 213 of the first side surface 21 of the first embodiment and the outermost periphery of the inclined segment 213 of the first side surface 21 of the second embodiment, and the top periphery of the lower surrounding wall 322 of the lower seat 32 is disposed slightly above the outermost periphery of the inclined segment 213 of the first side surface 21 of the third embodiment and the outermost periphery of the inclined segment 223 of the second side surface 22 of the third embodiment. As such, the first encounter (A) occurs inside the upper seat 31 and the lower seat 32, that is, the mixing of the second gas and the second liquid occurs inside the four-fluid atomization device 3 and, in the same manner, the mixing of the first gas and the first liquid also occurs inside the four-fluid atomization device 3.

It should be noted that, although the operation of the embodiments of the flow divider is explained with the four-fluid atomization device 3 as shown in FIGS. 20 and 21, the embodiments are not limited to be used in the four-fluid atomization device 3. For example, they may be used in a two-fluid or three-fluid atomization device.

It should be further noted that, a person of ordinary skill in the art would know that spray granules are generally formed by rapid encountering and mixing of liquid (e.g., a solution or slurry mixed with solvent, ceramic powder and dispersant) and gas. The key to determining the particle size of the final granules is the gas volume percent in a liquid-gas mixed fluid. In other words, the higher the gas volume percent in the liquid-gas mixed fluid is, the finer the final granules are. However, as the gas volume percent increases, the gas pressure increases as well. As such, the increase of gas volume percent is often limited, making it difficult to reduce the size of the spray granules as desired.

However, in the present invention, by virtue of the configuration of the annular channel 212, the annular channel 222, the inclined segment 213 and the inclined segment 223, the embodiments of the flow divider are able to supply high-volume gas without being limited by the gas pressure (e.g., the width of the annular channel 222 of the second side surface 22 of the main body 2 of the third embodiment may be increased by increasing the diameter of the main body 2), thereby greatly increasing the gas volume percent in the liquid-gas mixed fluid for reducing the size the spray granules.

In sum, the present embodiments of the flow divider for use in the atomization device has benefits as follows.

By virtue of the configuration of the annular channels 212, 222, and the inclined segments 213, 223 of the embodiments, the present invention has a simpler structure than the conventional flow divider 1, whose assembly process involves fixing together multiple metal frames (defining the inlet channel 11, and the outlet slit 13) and metal tubes (defining the diverging passages 12).

In addition, the second embodiment of the flow divider is able to provide a more uniform flow distribution, and when used in the atomization device, the width of the annular channel 212 of the first side surface 21 of the first embodiment and the width of the annular channel 222 of the second side surface 22 of the third embodiment may be by increased by increasing the overall size of their main bodies 2 such that higher volume of gas may be supplied for reducing the size of the spray granules without being limited by the gas pressure.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A flow divider adapted to be mounted in an atomization device for diverging a fluid, comprising:

- a main body that includes a first side surface and a second side surface being opposite to each other along a central axis of said main body, said first side surface having
  - a central segment that transversely intersects the central axis, and that has an inlet channel recessed toward said second side surface,
  - a generally annular channel that surrounds said central segment, that is recessed toward said second side surface, and that is spatially communicated with said inlet channel at a junction space disposed between two first imaginary lines that extend radially with respect to the central axis, and
  - an inclined segment that surrounds said annular channel;
- wherein a width of said annular channel along a radial direction of the central axis has a start measurement along one of the first imaginary lines, and an end measurement along the other one of the first imaginary lines, the end measurement being smaller than the start measurement, the width of said annular channel decreasing gradually from the start measurement to the end measurement along a first rotational direction with respect to the central axis; and wherein said inclined segment has one of a first configuration, in which said inclined segment extends outwardly with respect to the central axis and toward said second side surface, and a second configuration, in which said inclined segment extends outwardly with respect to the central axis and away from said second side surface.

2. The flow divider as claimed in claim 1, wherein:

said inclined segment has said second configuration;

said main body further includes at least one inlet hole that is formed in said central segment of said first side surface, and that extends through said first side surface and said second side surface;

said second side surface of said main body has
  a central segment that transversely intersects the central axis, and that has an inlet channel recessed toward said first side surface,
  a generally annular channel that surrounds said central segment of said second side surface, that is recessed toward said first side surface, and that is spatially communicated with said inlet channel of said second side surface at a junction space disposed between two second imaginary lines that extend radially with respect to the central axis, and
  an inclined segment that surrounds said annular channel of said second side surface;

a width of said annular channel of said second side surface along a radial direction of the central axis has a start measurement along one of the second imaginary lines, and an end measurement along the other one of the second imaginary lines, the end measurement of the width of said annular channel of said second side surface being smaller than the start measurement of the width of said annular channel of said second side surface, the width of said annular channel of said second side surface decreasing gradually from the start measurement to the end measurement along a second rotational direction with respect to the central axis; and said inclined segment of said second side surface has one of a first configuration, in which said inclined segment of said second side surface extends outwardly with respect to the central axis and toward said first side surface, and a second configuration, in which said inclined segment extends outwardly with respect to the central axis and away from said first side surface.

* * * * *